United States Patent
Mrozik et al.

(10) Patent No.: US 7,341,186 B2
(45) Date of Patent: Mar. 11, 2008

(54) PROOF OF PRESENCE AND CONFIRMATION OF PARCEL DELIVERY SYSTEMS AND METHODS

(75) Inventors: Walter R. Mrozik, Alpharetta, GA (US); Andrew Paul Funari, Oakland, NJ (US); David T. Ridley, Carmichael, CA (US); Dennis Estep, Duluth, GA (US); Robert L. Deckman, Chalfont, PA (US)

(73) Assignee: United Parcel Service of America, Inc., Atlanta, GA (US)

( * ) Notice: Subject to any disclaimer, the term of this patent is extended or adjusted under 35 U.S.C. 154(b) by 358 days.

(21) Appl. No.: 10/872,348

(22) Filed: Jun. 18, 2004

(65) Prior Publication Data

US 2005/0006470 A1    Jan. 13, 2005

Related U.S. Application Data

(60) Provisional application No. 60/480,173, filed on Jun. 20, 2003.

(51) Int. Cl.
G07B 15/02 (2006.01)

(52) U.S. Cl. .............................. 235/384; 235/385

(58) Field of Classification Search ........ 235/384–385; 705/22

See application file for complete search history.

(56) References Cited

U.S. PATENT DOCUMENTS

| | | | |
|---|---|---|---|
| 5,717,989 A | | 2/1998 | Tozzoli et al. |
| 6,151,588 A | | 11/2000 | Tozzoli et al. |
| 6,415,978 B1 * | | 7/2002 | McAllister ............. 235/462.01 |
| 6,634,551 B2 * | | 10/2003 | Barta et al. ................. 235/385 |
| 2003/0037009 A1 | | 2/2003 | Tobin et al. |

FOREIGN PATENT DOCUMENTS

| | | |
|---|---|---|
| JP | 05-165847 | 7/1993 |
| JP | 08-307545 | 11/1996 |
| JP | 11-175621 | 7/1999 |

OTHER PUBLICATIONS

A2b Tracking Solution—Colgate University/Cal Poly Pomona; http://www.a2btracking.com/m/_general/news_body.asp?rilDReport=20; Accessed Jun. 3, 2003; Dated Sep. 22, 2004. Applicants make no admission that this reference constitutes prior art.

Parcel Tracking: Trackpad—Parcel Tracking System; http://www.scotmailing.com/parcel_tracking.html; Accessed Jun. 3, 2003; Dated Sep. 22, 2004. Applicants make no admission that this reference constitutes prior art.

* cited by examiner

*Primary Examiner*—Lisa Caputo
(74) *Attorney, Agent, or Firm*—Alston & Bird LLP

(57) ABSTRACT

The present invention involves systems and methods of linking a unique identifier with a package identifier to provide confirmation of the delivery of the package to a certain location or individual. The unique identifier may be associated with a location or an individual. In one embodiment, it is a barcode and the package identifiers are barcodes as well. The barcodes are scanned by a service provider using a hand-held data acquisition and storage device thereby linking the unique identifier to the package identifiers. The information is transferred from the hand-held device to a database where it is used to compile reports for and provide information to the service provider, the shipper, and the recipient of the packages. The invention may be incorporated into an inventory management system such that when confirmation of actual delivery has been received, the recipient will release payment to its vendors.

31 Claims, 8 Drawing Sheets

PROOF OF PRESENCE AND CONFIRMATION OF PARCEL DELIVERY SYSTEMS AND METHODS

CROSS-REFERENCE TO RELATED APPLICATIONS

This application claims the benefit of U.S. Provisional Application No. 60/480,173, filed Jun. 20, 2003, which is hereby fully incorporated herein and made a part hereof.

BACKGROUND OF THE INVENTION

1. Field of the Invention

The present invention generally relates to delivery of items, and particularly relates to the delivery of items such as parcels (a.k.a. "packages") that have been shipped by a shipper via a delivery service provider (hereinafter "service provider"), to an intended recipient (a.k.a. "consignee") and systems and methods for the confirmation of such delivery.

2. Description of Related Art

Proof of actual delivery of ordered items is often desired for the release of payment for such items or for the allocation of inventory to its actual location. For instance, in one scenario a corporate headquarters (HQ) may be responsible for maintaining the inventory in one or more retail outlets. HQ may order items from any number of vendors (a shipper). The vendor may ship the products to the retail outlets via a service provider. Because the shipment of such items may be delayed for various reasons by the vendor, be shipped to the wrong retail outlet, or be damaged or lost in transit, the HQ may be reluctant to pay for items ordered, but may wish to pay only for items actually delivered. Generally, proof of delivery has been a consignee's signature. Some retailers desire greater accountability than mere signature acquisition as such signatures may easily be forged, or desire better systems and methods to reconcile orders, shipments with deliveries. Other forms of delivery confirmation beyond mere signature upon receipt have generally been prohibitively expensive or cumbersome.

In other instances, items that are intended to be shipped to one location may be either incorrectly labeled or inadvertently delivered to another location. Referring back to the HQ and retail outlets example above, there may be multiple retail outlets located relatively close to one another, in some instances there may be retail outlets having the same corporate parent located in the same mall. Although not delivered to its intended location, the inventory items may be accepted and placed into the inventory of the retail outlet in which it is received. In such instances, it may be difficult for the HQ to determine where the inventory items were actually received.

In yet other instances, a customer who has ordered an item may not want their credit card, debit card, bank account or customer account charged until they have received the item. The shipper will require adequate proof that the intended recipient has received the items before charging the customer's account. However, mere signatures may not afford sufficient assurance as an imposter recipient can forge them. The customer may face a difficult challenge in proving that they, in fact, did not receive the package. Conversely, a shipper may face a significant burden in proving that a customer received an item when the customer claims that such receipt never occurred. Furthermore, a shipper will want timely communication of the confirmed delivery so that the shipper may bill and/or collect from the recipient as quickly as possible. Rapid collections avoid the delay from time-dependent cyclical billing and also help decrease bad debt write-offs. Previous delivery and billing systems are also cumbersome for use in present just-in-time and other inventory management systems as in such systems inventory is received in an almost constant stream from one party to the other and traditional time-based cyclical proof of receipt and billing systems are not conducive to such dynamic commerce.

Therefore, systems and methods are needed to overcome the challenges present in the art, some of which have been described above.

BRIEF SUMMARY OF THE INVENTION

The embodiments of the present invention provide improvements to a package delivery system whereby a service provider may provide a shipper with indication of the actual delivery location of a package and enhanced proof of the receipt of the package above that of a mere signature. Further, the systems and methods described herein as embodiments of the present invention provide the improvements described above, yet do not significantly increase the burden upon the service provider in delivering shipped items.

Large retailers often want assurance that packages are delivered and that they are delivered to the correct locations (e.g., stores, outlets, etc.). In some cases, there may be several different retail stores owned by the same retailer in the same mall or strip-mall location. Embodiments of the present solution provide the assurance sought by such retailers so that the retailer may properly allocate its inventory and also for release-of-payment purposes.

Embodiments of the present invention involve unique indicia ("location indicia") that may only be obtained by the service provider while at the delivery location. The unique indicia at the delivery location is linked with one or more other unique indicia ("package indicia") that are each associated with a package such that the linked indicia (location indicia and package indicia) indicate the location to which the one or more packages have been delivered and provide proof of delivery of the one or more packages to the delivery location. Indicia associated with the delivery location are obtained by a physical presence at the delivery location by an agent of the service provider. Packages that are to be delivered to the delivery location are each identified by unique indicia (the package indicia), generally for tracking purposes. The location indicia is linked to the one or more unique indicia that are associated with each package. Information about each package and its link to the delivery location is transferred to a service provider's package tracking system where the shipper may confirm delivery of the package. The linking of the delivery location indicia to the package indicia is proof that the one or more packages have been delivered to the delivery location.

In one embodiment, an agent of a service provider delivery person scans a customized store placard, located within or at each delivery location, which identifies the store receiving the delivery. The placard is scanned after the delivery agent selects the delivery location in a hand-held data-acquisition and storage device generally carried by the delivery agent and usually pre-programmed with information about delivery stops. The package indicia of each delivered package at a delivery location is then scanned, thereby resulting in the linking all the indicia of the delivered packages to the unique location indicia. The package indicia, in one embodiment, may be a package tracking identifier in the form of machine-readable indicia such as, For example, a barcode as assigned by the service provider. The package indicia may also have a human-readable component that is known to the shipper. The location indicia may also be machine-readable indicia such as one or more barcodes on the placard at the delivery location. The location indicia may also have a human-readable component. In one embodiment, an agent of the service provider electronically scans the machine-readable location indicia and the machine-readable package indicia with a scanning device that may be incorporated into the data-acquisition and storage device. The scanning device or the data-acquisition and storage device may link the machine-readable package indicia to the machine-readable location indicia, or the information may be transferred from the scanning device or data-acquisition and storage device to a computer where the linking is performed. The information about the package, including the linking of the package indicia to the location indicia is made available to the shipper. Thus, because the unique location indicia is associated with a physical address, a shipper knowing the package tracking number is able to determine that actual location where the package was delivered and is provided assurance above that of a mere signature that the package had been delivered to the delivery location.

These, and other aspects of the invention are described in greater detail in the drawings and description herein.

BRIEF DESCRIPTION OF THE SEVERAL VIEWS OF THE DRAWINGS

Figure 1A:
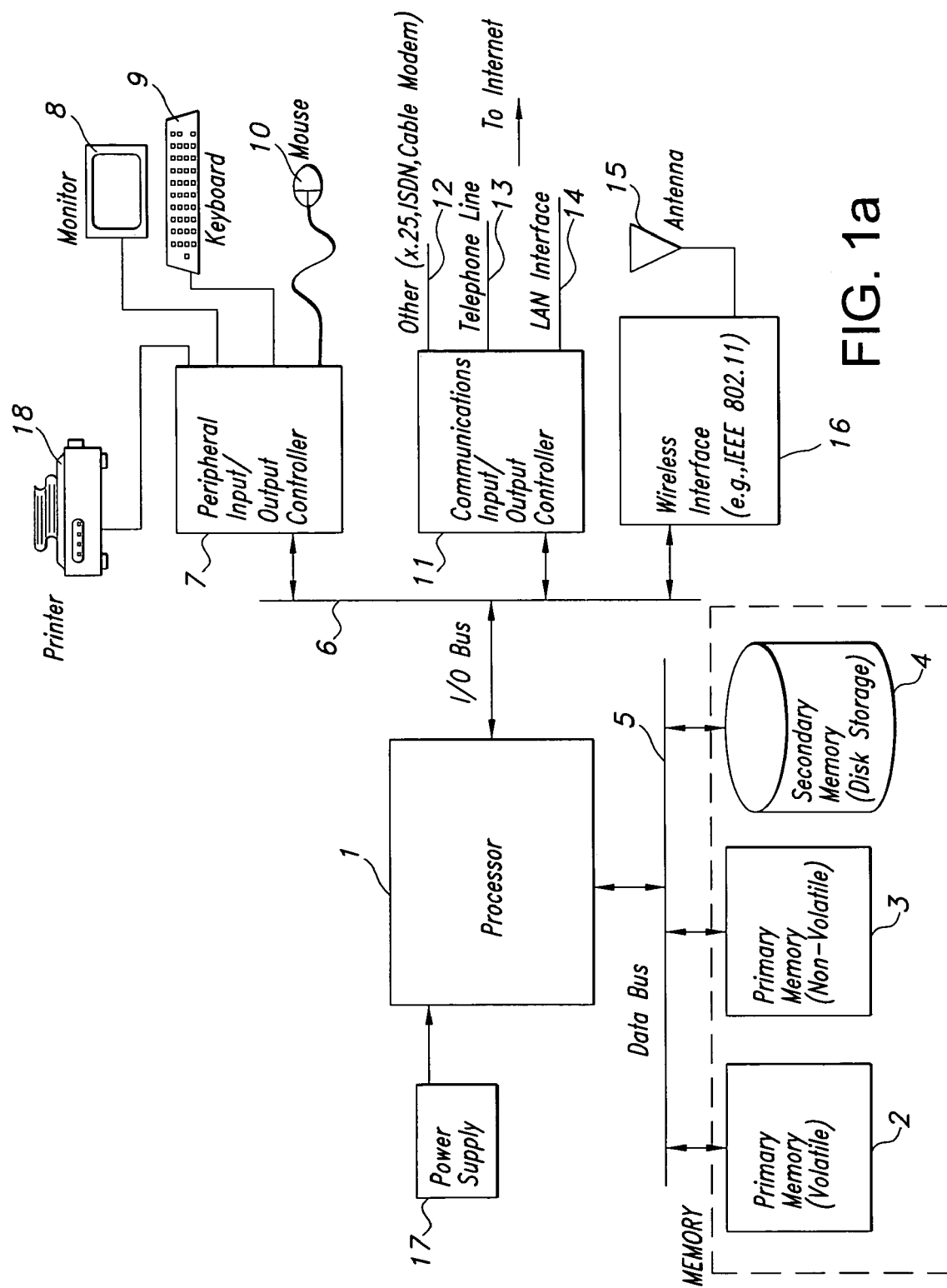
Figure 1B:
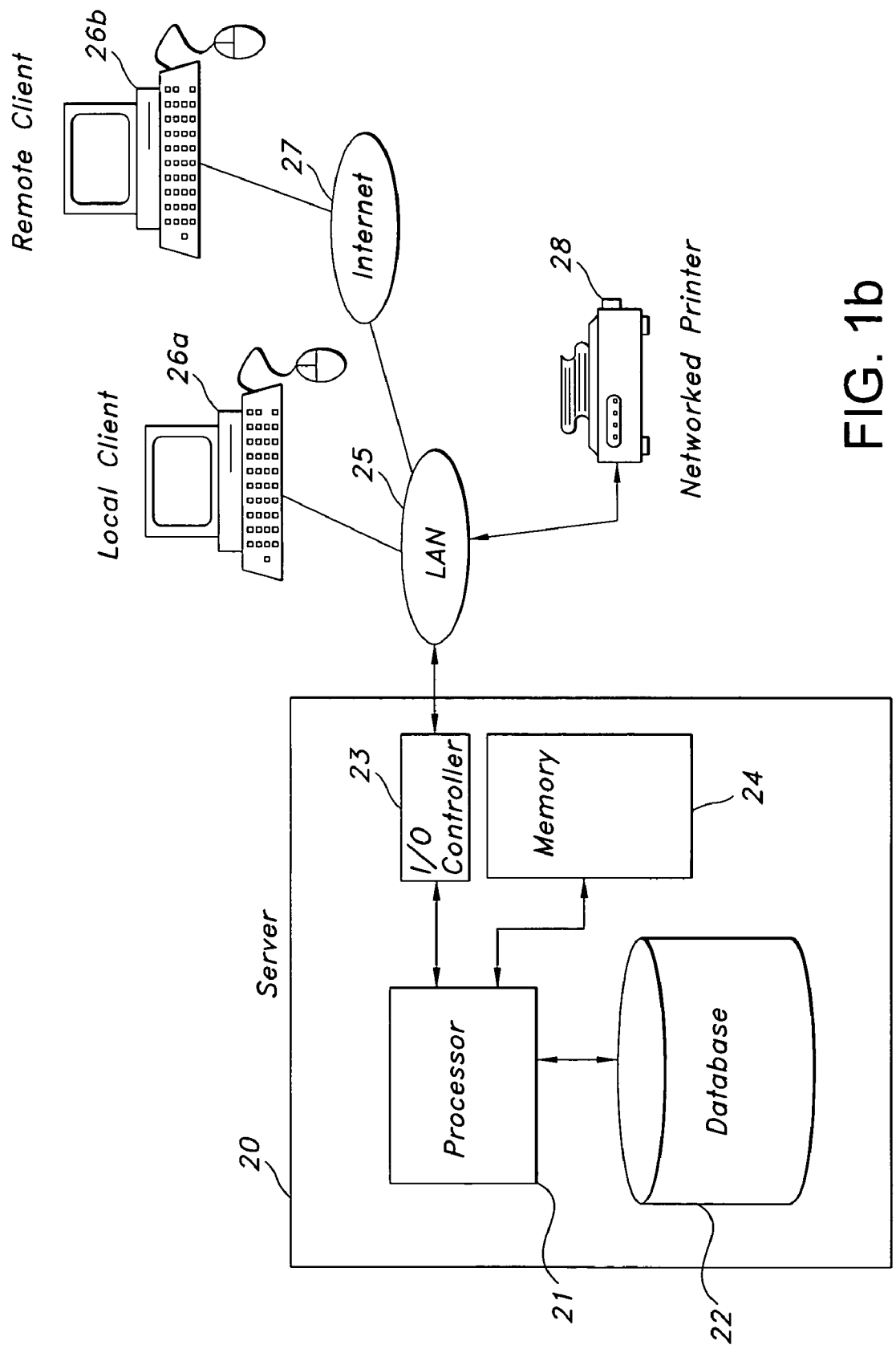
Figure 2:
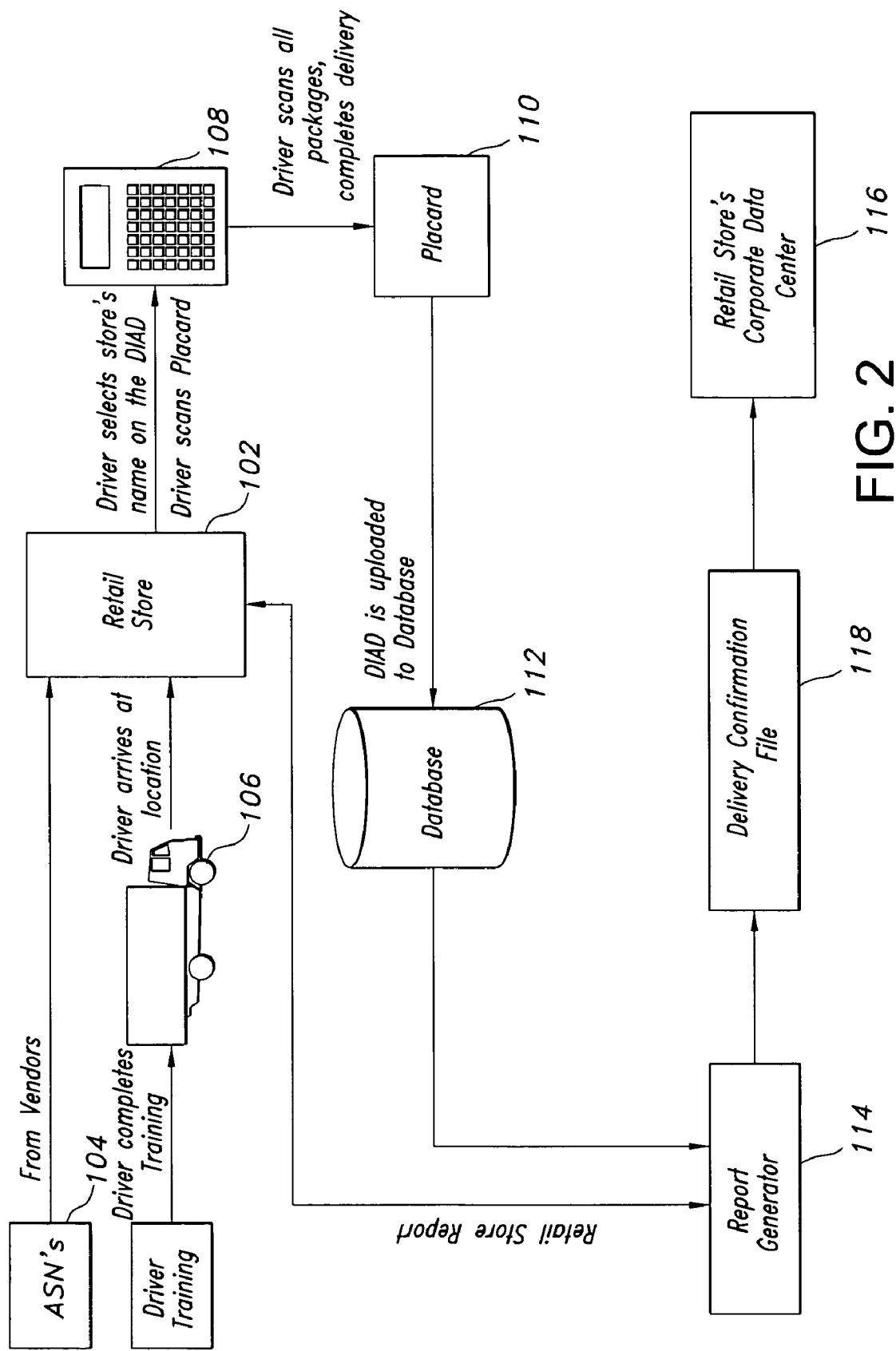
Figure 3:
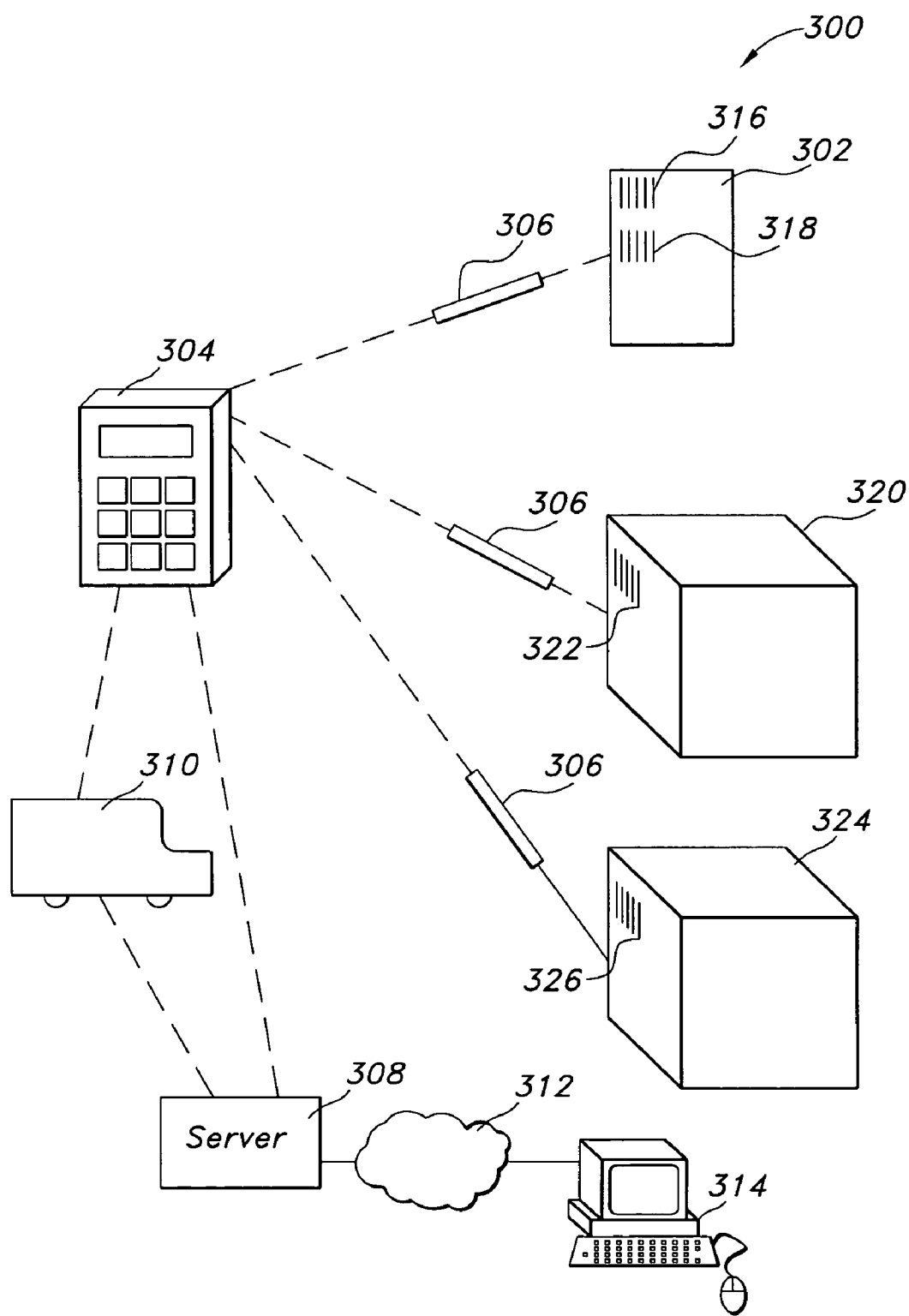
Figure 4:
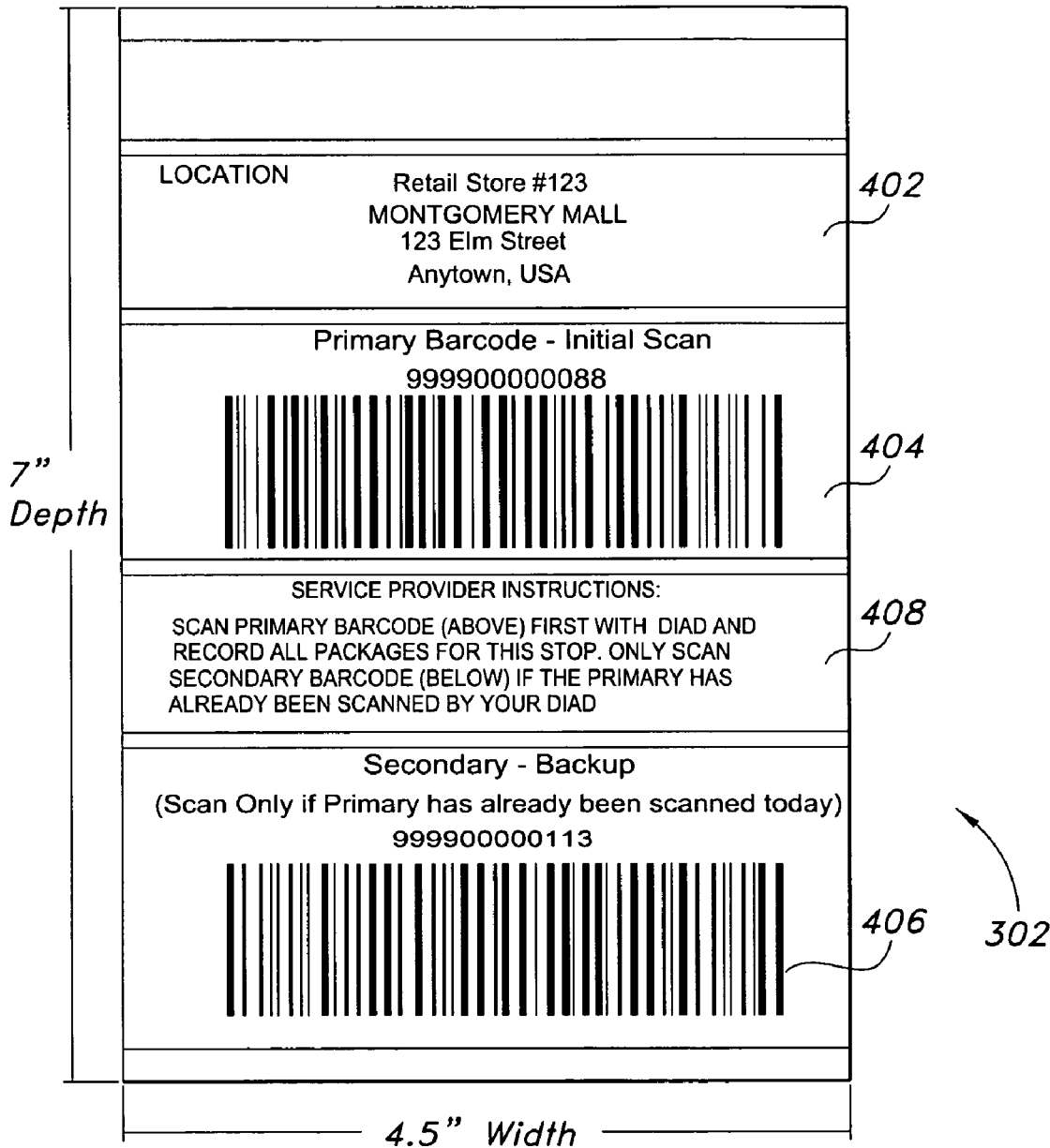
Figure 5:
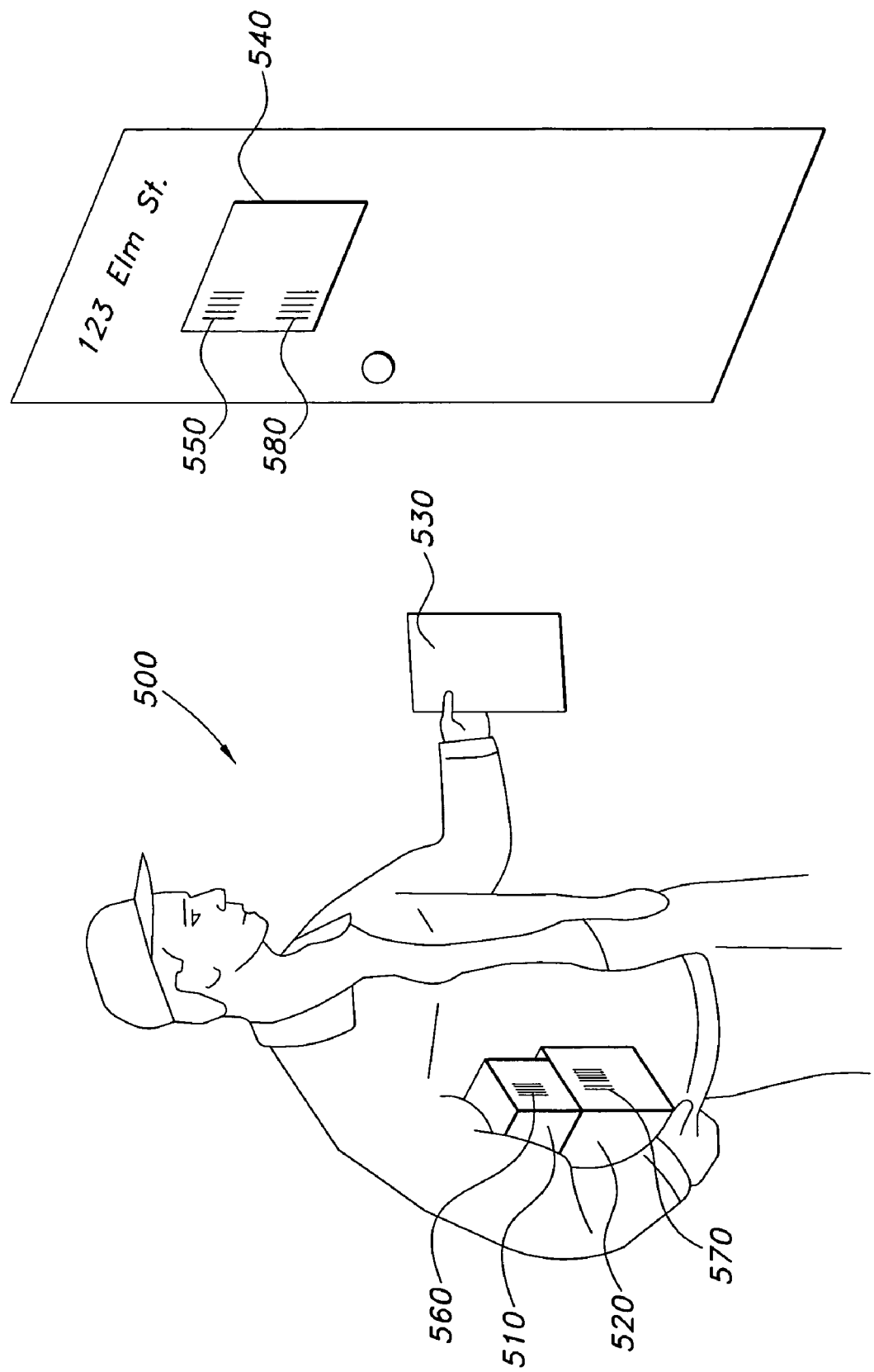
Figure 6:
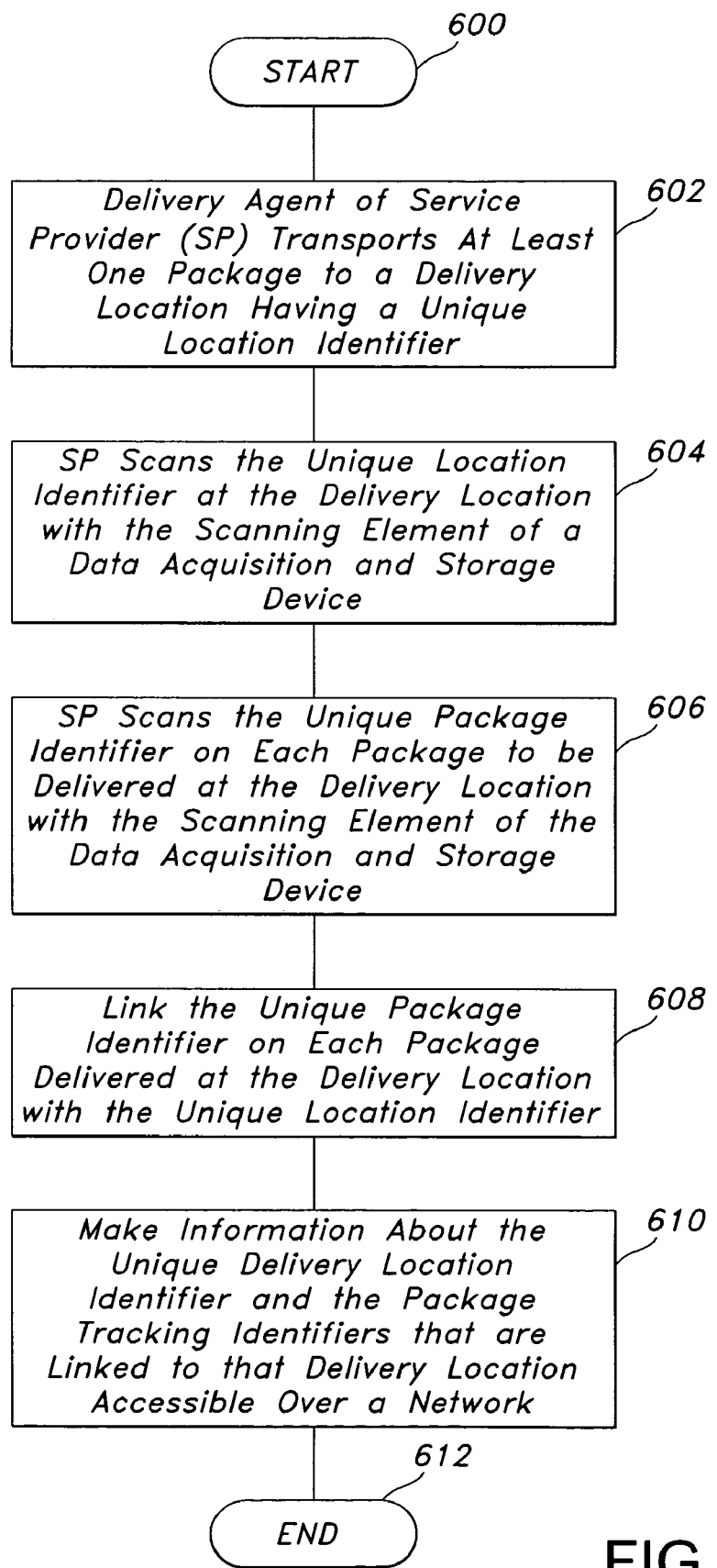
Figure 7:
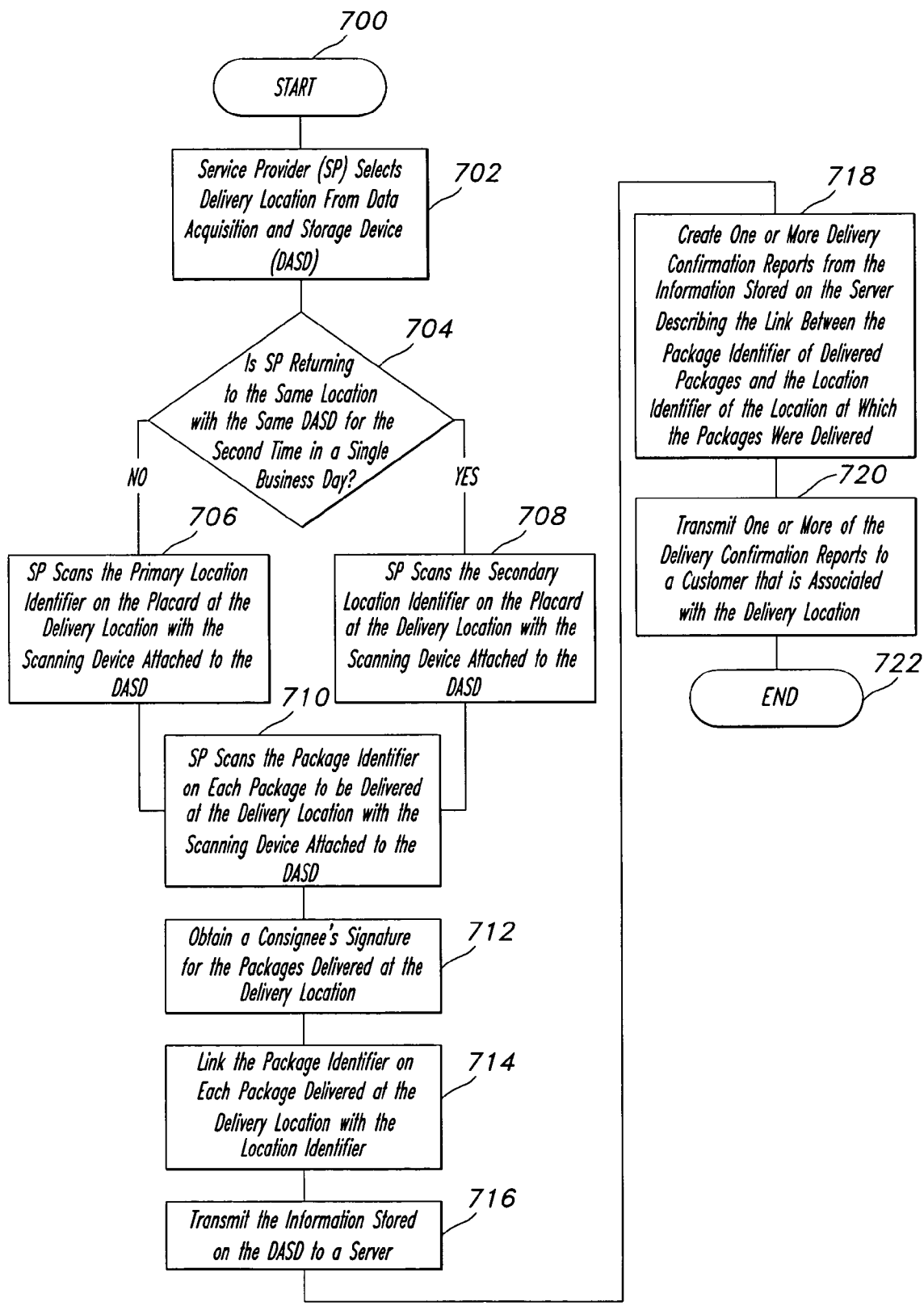

Having thus described the invention in general terms, reference will now be made to the accompanying drawings, which are not necessarily drawn to scale, and wherein:

FIG. 1a is an illustration of one embodiment of a computer that can be used to practice aspects of the present invention;

FIG. 1b is an embodiment of a processing system having a distributed communication and processing architecture that may be used to practice aspects of the present invention;

FIG. 2 is an exemplary business flow model of an embodiment of the invention;

FIG. 3 is an illustrative view of the various data connections between various elements of an overall system according to an embodiment of the present invention;

FIG. 4 is an illustrative embodiment of a placard that may be located at consignee's delivery location, the placard having one or more indicia that are associated with indicia on the packages intended for delivery;

FIG. 5 is an illustrative view of a delivery agent holding a plurality of parcels at the door of a typical store located at the address, 123 Elm Street;

FIG. 6 is an exemplary flowchart illustrating the steps involved in delivering a package to a delivery location and linking unique location indicia with information about at least one package delivered to the location, in an embodiment of the invention; and FIG. 7 is an exemplary flowchart illustrating the steps involved in delivering a package to a delivery location, confirming the delivering, and transmitting information about the confirmed delivery to a customer associated with the delivery location, in an embodiment of the invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers, if referenced herein, refer to like elements throughout.

The present invention is described below with reference to block diagrams and flowchart illustrations of methods, apparatuses (i.e., systems) and computer program products according to embodiments of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The general concept of the embodiments of the present invention is for an agent of a parcel delivery service to obtain some unique indicator available only at the delivery location at which certain packages were delivered, link the unique location indicator with unique indicia associated with the certain packages, and provide a form of proof that the certain packages were delivered at the delivery location. Proof of such delivery may be obtained by recording unique information that is only available at the delivery location. This information is obtained and recorded at the time of delivery and is associated with information about the packages such as, for example, unique indicia associated with each package, so that the one who ordered the package, the one that shipped the package and the parcel delivery service have information that links the packages to the location that they were delivered, thereby providing a higher degree of confidence that delivery has been made and providing proof that an agent of the service provider was at the delivery location.

In one embodiment of the invention, a retail sales organization with multiple sales outlets receives products shipped from one or more vendors, distribution centers or other retail outlets ("shippers"). These shippers ship their product via a service provider such as, for example, United Parcel Service ("UPS"). The items are shipped in packages that are identified by unique tracking identifiers provided by the service provider. Such tracking identifiers are generally some form of machine-readable indicia, such as, for example, a barcode. They also may be human-readable identifiers such as alphanumeric characters or they may be both, machine-readable and human-readable indicia. The tracking identifiers generally allow a shipper (e.g., the vendors) to track a package during shipment by accessing a service provider's website over a network such as the Internet and entering the human-readable portion of the tracking identifier; or by calling a certain telephone number and entering the human-readable tracking indicia in some form such as, for example, touching the corresponding keys on a touch-pad telephone or through a voice-recognition system. The shipper may also have package tracking software that connects with the service provider either through the Internet or some other network and may interact with the service provider's website with either the human-readable or the machine-readable information.

Generally, when a package is delivered, the service provider's delivery agent will record the delivery in some manner such as, for example, scanning the package tracking identifier and/or having a person sign for the receipt of the package. This information is generally captured by an electronic hand-held device such as, for example, a DIAD ™ as utilized by UPS, a personal digital assistant ("PDA") type device, or some other type of portable electronic device. Usually this is a hand-held device that is carried by the service provider's agent. Captured information may be transmitted from the hand-held device to another computer at the time of capture (e.g., wirelessly), it may be transmitted to another computer once the hand-held device is placed into a cradle within a service provider's vehicle, or such information may be uploaded to another computer at a centralized location. Delivery confirmation may also be manually captured by, for example, having the recipient manually sign next to a package's tracking identifier on a log sheet.

The embodiments of the present invention provide for the delivery agent of the service provider to capture at least one second identifier at the time of delivery of one or more parcels at a particular delivery location. This second identifier is associated with the delivery location and may be referred to as a location identifier or location indicia. The second identifier may be unique human-readable indicia, machine-readable indicia, or a combination of both, human-readable and machine-readable indicia. It is generally in the form of one or more barcodes located on a placard that stays at the delivery location, although other forms such as, for example, radio frequency identification ("RFID") tags, infrared devices, magnetic strips, electronic signals, optical signals, digital signatures, sounds, colors, shapes, odors, etc., may be used in various embodiments of this invention.

While making a delivery at a particular delivery location, the service provider's delivery agent will obtain information about the location identifier and information about the package identifier of each package that is to be delivered to that location. Generally, obtaining the location identifier information is accomplished by scanning a unique barcode on the placard at the delivery location and the package identifier information is obtained by scanning a unique barcode on each package scheduled for delivery at that location. The placard barcode (i.e., location identifier) is then linked to the barcode of each package (package identifier) that is to be delivered at that delivery location. The linking occurs electronically either in the hand-held device or after the information is transferred to another computer. The "linking" aspect and embodiments of the systems and methods of this invention are more fully described in U.S. Pat. No. 6,634,551; "Delivery Notice And Method Of Using Same"; filed Mar. 23, 2001 and issued on Oct. 21, 2003 and U.S. patent application Ser. No. 10/689,514; Systems and Methods of Item Delivery Utilizing A Delivery Notice; filed Oct. 20, 2003; both fully incorporated herein and made a part hereof.

Because the placard is located at the delivery location and each placard has one or more unique barcodes, each unique barcode on a placard is associated with a specific delivery location. The placard barcodes are associated with the physical address of the delivery location. This may be accomplished, for example, by storing cross-references of the location indicia with corresponding address information in an electronic database or an electronic table as is known in the art. Therefore, when a placard barcode is linked with a package barcode, the location indicia may be used to access the electronic database or table and indicate the delivery location (i.e., address) where the package was delivered and provide proof that the package with that package barcode has been delivered to the location with that unique placard barcode. Linking the package indicia with the location indicia also provides proof that the delivery service's agent was at the delivery location having the unique location indicia. This proof of delivery may be electronically stored and made available to vendors (e.g., shippers), and those who ordered the products.

Because the embodiments of the present invention provide indication of where shipped products or items are actually delivered and provides enhanced proof of the delivery of the items, the information may be used to track and allocate inventory to its actual delivery location and to release funds for the payment of the shipped product. Furthermore, such information may be used to create operational and managerial reports for the consignee as well as the vendors. Such reports may be electronically distributed to the parties.

In several of the embodiments of the invention referenced herein, a "computer" is referenced. The computer may be, for example, a mainframe, desktop, notebook or laptop, hand-held, hand held device such as a data acquisition and storage device, etc. In some instances the computer may be a "dumb" terminal used to access data or processors over a network. Turning to FIG. 1a, one embodiment of a computer is illustrated that can be used to practice aspects of the present invention. In FIG. 1a, a processor 1, such as a microprocessor, is used to execute software instructions for carrying out the defined steps. The processor receives power from a power supply 17 that also provide power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access the Internet, intranets, LANs, or other data communication facilities.

Finally, the processor 1 may communicate with a wireless interface 16 that is operatively connected to an antenna 15 for communicating wirelessly with another devices, using for example, one of the IEEE 802.11 protocols, 802.15.4 protocol, or a standard 3G wireless telecommunications protocols, such as CDMA2000 1× EV-DO, GPRS, W-CDMA, or other protocol.

An alternative embodiment of a processing system that may be used is shown in FIG. 1b. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to the Internet 27. A remote client computer 26b may execute a web browser, so that the remote client 26b may interact with the server as required by transmitted data through the Internet 27, over the LAN 25, and to the server 20.

Those skilled in the art of data networking will realize that many other alternatives and architectures are possible and can be used to practice the principles of the present invention. The embodiments illustrated in FIGS. 1a and 1b can be modified in different ways and be within the scope of the present invention as claimed.

FIG. 2 illustrates a business flow model that describes an embodiment of a system of the invention and methods of conducting business utilizing the system. According to the embodiment shown, a retail store 102 receives one or more advanced shipping notices (ASN's) 104 from vendors. An ASN 104 is a notice that the vendor is preparing to ship, or has shipped, some product or items to the store 102, though such ASN's are not required to practice the invention. In one embodiment, the ASN will contain one or more package tracking identifiers such as package tracking numbers. A service provider 106 then transports the items to the store 102. Upon arrival at the store 102, an agent of the service provider (a/k/a a "delivery agent") will select the store's name or other identifying information (address, building name, telephone number, etc.) as it is contained in a hand-held data acquisition and storage device 108 or other portable computer device that is generally carried by the service provider 106. Such a data acquisition and storage device 108 may be, for example, a UPS DIAD TM device, a PDA, or some other form of electronically capturing and storing information.

In one embodiment, the packages that are associated with the selected store 102 are identified by one or more package tracking identifiers that are stored within a memory of the hand-held device 108. By choosing the location in the hand-held device 108 in the manner described above, the package tracking identifier of each package that is to be delivered at that location is brought from memory and displayed on the display of the hand-held device 108. The agent of the delivery service confirms that the package tracking identifier displayed coincides with the tracking information on a package for delivery. If there is a discrepancy between the stored package tracking identifiers and the package tracking information on the packages for delivery, the discrepancy will be noted. Depending upon the severity of the discrepancy, the packages may or may not be delivered. If the displayed package tracking identifiers correlate with the packages to be delivered, the delivery agent scans a location indicia on a placard 110 located at the store 102. The placard 110 is associated with one or more location indicia (e.g., barcodes, RFID transponder tags, etc.). By choosing the location as described above, the location information has been previously electronically associated with the package tracking identifiers of the packages to be delivered at the chosen location, and by scanning at least one of the location indicia on the placard 110, the stored package tracking identifiers are electronically linked with the location indicia either by the hand-held device 108, or the linking occurs once the information is transferred from the hand-held device 108 to another computer (not shown).

In another embodiment, the package tracking identifiers for a selected store 102 are not stored within the memory of the hand-held device 108. The delivery agent scans the location indicia on the placard 110 located at the store 102. The delivery agent then scans the package tracking identifier of each package to be delivered at that location. The location indicia and the indicia for the packages are then linked, as described above.

The Overall System

Reference is now made to FIG. 3, which is an illustrative view of the various data connections between various elements of the overall system 300 according to an embodiment of the present invention. In this embodiment, the system 300 includes a placard 302 or other machine-readable indicia, having one or more location indicia 316, 318 thereon, a data acquisition and storage device 304 having a scanning element 306, and a server 308. In an alternate embodiment the system can also include a parcel delivery car 310. The system can also include an Internet 312 connection or other suitable network connection to provide access by customers (a.k.a. "users") to typical computers 314.

The Placard

An exemplary embodiment of a placard 302 is shown in FIG. 4. In this embodiment, the placard 302 identifies the primary location, by address 402, of the delivery location of which it is associated, which in this instance is 123 Elm Street, Anytown, USA. This particular embodiment utilizes one or more barcodes 404, 406 as location identifiers, however it is to be appreciated that such location identifiers are not limited to barcodes. In this embodiment, the placard 302 has more than one location indicia 404, 406 because a service provider 106 may make more than one delivery trip to a location in a single business day. If there were only one indicia on the placard 302 that was scanned each time a delivery agent made a visit to the location on a single business day, it may appear that all the packages delivered that day to the location were delivered in a single trip rather than the actual multiple trips. Furthermore, the data acquisition and storage device 304 may be programmed to not allow the same location indicia to be scanned twice in the same business day. A primary barcode 404 is scanned by the delivery agent using the data acquisition and storage device 304 upon the service provider's 106 first visit to that store 102 in a business day. If the same delivery agent of the service provider 106 (or someone with the same data acquisition and storage device 304) makes a second visit to that same store 102 to deliver additional packages, the delivery agent will scan the secondary barcode 406. In other embodiments, the hand-held device 304 may be programmed to allow multiple entries (e.g., scans) of the same barcode or location identifier on the same day. In yet other embodiments, the hand-held device 304 may provide a visual, audible or vibratory warning or indication that the primary barcode 404 and/or the secondary barcode 406 have been previously scanned that business day.

Directions or instructions may be provided to the delivery agent by the hand-held device 304 to scan the secondary barcode 406 if the primary barcode 404 has previously been scanned that business day. In other embodiments, the hand-held device 304 may disallow the scanning of the primary barcode 404 if it has previously been scanned that day. As before, directions or instructions may be provided by the hand-held device 304 for the delivery agent to scan the secondary barcode 406, if scanning of the primary barcode 404 is disallowed.

The placard 302 may also have an area for instructions 408 to the service provider 106. In other embodiments, the placard 302 may have only one barcode 404, or it may have more than two barcodes (if the location is frequently visited by the same service provider 106 multiple times during a business day). In yet other embodiments, the placard 302 may use other forms of location identification other than barcodes such as, for example, RFID tags, infrared, magnetic strips, electronic signals, optical signals, digital signatures, sounds, colors, shapes, odors, etc. or any other method of uniquely identifying the location. One or more forms of these location identifiers may be used on a single placard 302.

It is to be appreciated that it is not necessary for the location indicia to be mounted on a placard without departing from the spirit and scope of the invention. For instance, an RFID transponder tag may be made available at the location where deliveries are normally made, or one or more barcodes may be on a sheet of paper or adhered to a wall rather than mounted on a placard.

The Packages

As shown in FIG. 3, an exemplary package 320 includes a machine-readable package code 322 (a.k.a. "item code"), which in one embodiment each item code is a "tracking number" or "1Z" number as referenced by United Parcel Service, although obviously other package codes used to track or identify packages may also be used. The same is true for exemplary package 324, which includes a similar machine-readable package code 326. In both these cases, in one embodiment, the machine-readable package code is in the form of visible indicia, although other non-visible means such as magnetic media, sound, texture, or the like may also be used without departing from the spirit and scope of the invention. Also in both these cases in one embodiment the indicia is a barcode, although other codes are contemplated without departing from the spirit and scope of the invention.

The machine-readable package codes 322 and 326 are configured to be read by a code reader such as a barcode scanner such as known in the art, although other code readers are contemplated without departing from the spirit and scope of the invention.

Data Acquisition and Storage Device

Continuing to refer to FIG. 3, the system 300 according to the embodiments of the present invention also includes a data acquisition and storage device 304 having a scanning element 306 (e.g., barcode reader) configured to scan the machine-readable indicia (e.g., barcodes 316, 318, 322, 326) discussed above.

The data acquisition and storage device 304 may be such as known under the mark DIAD ™, equipped with a suitable scanner 306 and loaded with the appropriate hardware and software suitable to perform the scanning and data storage features noted below or other electronic devices as previously described. As previously described, the data acquisition and storage device may also be a PDA, hand-held computer, or other form of electronic data acquisition and storage device. Briefly stated, such scanning capabilities include the capabilities to scan (i.e., "read") machine-readable codes such as, for example, barcodes and RFID transponder tags. The associated software and hardware include the capabilities of converting the readings from the scanner to appropriate electronic data for storage within the data acquisition and storage device 304. The data acquisition and storage device 304 should also include appropriate hardware and software to allow such data to be transferred from the data acquisition and storage device 304 to an external storage means such as a computer server 308 as is known in the art.

Server

A server 308 as noted above can receive data from the data acquisition and storage device 304 through a direct route such as shown in dotted line, or through an indirect route also as shown in dotted line through hardware associated with the driver's package car 310. It should be understood that the type of connecting hardware or software is not essential to the present invention; many different types of data acquisition and storage devices and transfer means may suffice. Furthermore the server 308 may be comprised of one or more servers and/or computing devices, which may or may not have functions other than those described herein. It is to be understood that the database 112 as shown in FIG. 2 may reside on the server 308 in one embodiment of the invention.

Information on the server 308 is used to provide information for the package recipients through use of the Internet 312 (or other suitable network). As discussed earlier, the package recipients and/or other parties to the shipping transaction and/or other third-parties may be provided various reports indicating the human-readable delivery location codes 316, 318 over the Internet 312 or other network means, that provide information about delivered parcel(s), where they were delivered, and parcels that were not delivered.

The Delivery Agent

Reference is now made to FIG. 5, which is an illustrative view of a delivery agent 500 holding a plurality of parcels 510, 520, at the door of a typical store located at the address, 123 Elm Street. In the view shown, the agent 500 has scanned at least one machine-readable indicia 550, 580 on a placard 540 by use of a data acquisition and storage device 530.

Example

It will first be assumed that a computer system from XYZ corporation is to be delivered in the form of two boxes, by a delivery agent 500 (working for a company such as, for example, UPS) as shown generally in FIG. 5, to a location having an address of 123 Elm Street. It will be assumed that two parcels 510, 520, are to be delivered, with each parcel including a different machine-readable parcel code (a.k.a. "item code") 560, 570 readable therefrom. It will also be understood that delivery agent 500 will be equipped with at least a data acquisition and storage device 530.

Approach to Delivery Location

Referring now to FIGS. 3 and 5, as noted above, the delivery location is at 123 Elm Street. The delivery agent 500 such as shown in FIG. 5 will arrive at the 123 Elm Street address. In one embodiment, the delivery agent will then access or "pull up" the address on the data acquisition and storage device 530, and will scan with scanner 530 the codes 560, 570 on both packages 510, 520, respectively. In one embodiment, the package tracking identifiers 560, 570 are barcodes, but in other embodiments they may be RFID tags, infrared, magnetic strips, electronic signals, optical signals, digital signatures, sounds, colors, shapes, odors, etc., or any other method of uniquely identifying a package. The delivery agent 500, in one embodiment, will then press "Enter" on the data acquisition and storage device 530. This may be understood as the machine scanning of a machine-readable "item code" or "parcel code".

The delivery agent 500 will scan a location identifier 550, 580 on the placard 540. In one embodiment, the location identifiers 550, 580 are barcodes, but in other embodiments they may be RFID tags, infrared, magnetic strips, electronic signals, optical signals, digital signatures, sounds, colors, shapes, odors, etc., or any other method of uniquely identifying a location. At least one location identifier 550, 580 from the placard 540 is then linked with each package tracking identifier for each package to be delivered at that delivery location. This linking occurs either in the hand-held device 304 or it may occur in another computer once the scanned information is transferred. In other embodiments, if the packages are not provided with package-tracking identifiers, an identifier will be associated with the package by a delivery agent. This identifier may be, for example, one or more of a barcode, RFID tag, infrared signal, magnetic strip, electronic signal, optical signal, digital signature, sound, color, shape, odor, etc., or any other method of uniquely identifying a package.

In one embodiment the service provider may be required to obtain the signature of a consignee at the delivery location in order to complete the transaction. The hand-held device 304 may electronically capture this signature, in one embodiment. In one embodiment, the hand-held device 304 is programmed such that the delivery agent 500 is unable to complete the transaction at the delivery location unless a location identifier 550, 580 has been scanned from the placard 540.

Now referring back also to FIG. 2, the information at least regarding location identifiers and package tracking identifiers that is contained within the hand-held device 304 is transferred to a database 112. If the hand-held device 304 did not already link the location identifier and the package tracking identifiers, they are linked once the information is transferred to the database 112. The database 112 may be a part of a larger system employed by the service provider 106, such as for example; it may reside as a part of the DIALS TM database as utilized by UPS.

The DIALS TM database is a database of information collected by service provider drivers in their hand held data acquisition and storage device 304, such as, for example, a DIAD TM device. The records in DIALS TM are indexed with the package tracking identifiers of delivered packages so that the package tracking identifiers can be cross-indexed against a package level detail (PLD) database or a repository containing package manifest records. When a package is delivered to a particular store 102, the DIALS TM database is updated with the delivery information. The package tracking number of a delivered package can then be cross-referenced against the package delivery database to obtain information about that package, including the original manifest record.

Part, or all of the DIALS TM database may reside on the server 308 as described above, or the server 308 may have access to the DIALS TM database and/or the DIALS TM database may have access to the server 308.

Referring again back to FIG. 2, information from the database 112 may be extracted and one or more reports 114 generated from this information by a report generator 114, or the information may be combined with additional information about the packages, the store 102, the vendors, the consignees, etc. Reports may include but are not limited to delivery reports, delivery exception reports, data integrity reports, etc. For example, in one embodiment where the ASN 104 received by a store 102 includes package tracking identifiers, the ASN information may be provided to the service provider 106 and a report prepared by the service provider 106 that reconciles anticipated deliveries (as identified by the package tracking identifiers in the ASNs) with actual deliveries to that store 102, as such actual deliveries are determined by the linking of a location identifier with package tracking identifiers. In this way, exceptions can be identified and further, the actual disposition of packages identified in an ASN that are not delivered to their intended store can be determined from the service provider's package tracking system. Furthermore, a delivery confirmation file 118 may be created by the report generator 118. The delivery confirmation file 118 includes information about one or more unique location indicia and the unique package tracking identifiers that have been linked to the location indicia at the time of delivery of the packages. The delivery confirmation file 118, along with all other reports created by the report generator 114 may be electronically transmitted to a store's 102 headquarters or corporate data center 116. The service provider may, or may not, charge a fee to the retail store 102 for providing such a reconciliation report.

Certain reports may be used by the service provider 106 for performance monitoring, billing, inventory reconciliation, etc. As previously described, reports or certain information from the reports may be electronically transmitted to the retailer's headquarters 116 as, for example, a file containing delivery confirmation information 118. The information transmitted to the headquarters 116 includes the store location identifier as obtained from the placard 110 and the individual package tracking identifiers as obtained from the delivered packages. The retailer's headquarters 116 may use this information to verify the delivery of the items with the provided package tracking identifiers. The retail headquarters 116 may also use the information for internal reporting and operational purposes, including; reconciling inventory by charging out inventory costs to the actual receiving store 102 identified by the in-store placard 110, relieving inventory costs from the original planned receiving store when a package has been delivered to another location, re-order inventory for original planned store, validate the receipt of the vendor's merchandise within the retailer's family of stores and releasing payment for the product, validate the receipt of individual packages and releasing "freight collect" payments, and denying receipt of individual cartons and generating a claim with the service provider for recovery of costs. These reports are generally created and transmitted on a recurrent basis, usually determined by time. For instance, they may be created during the overnight hours and transmitted each morning to the retailer's headquarters 116. However, they may also be created on an ad hoc or as needed basis. Information from the database 112 regarding the delivery of the packages to a store 102 may also be transmitted to the store 102.

FIG. 6 is an exemplary flowchart illustrating the steps involved in delivering a package to a delivery location and linking unique location indicia with information about at least one package delivered to the location, in an embodiment of the invention. Step 600 begins the delivery confirmation process. In Step 602, a delivery agent of the service provider transports at least one package to a delivery location having a unique location indicia. At Step 604, the delivery agent scans the unique location identifier with a data acquisition and storage device. In Step 606, the delivery agent scans the package identifier of each package that is to be delivered to that delivery location with the data acquisition and storage device and each package intended for delivery at that location is left at the location in accordance with the service provider's business rules. At Step 608, the scanned unique location identifier is linked with the package identifier of each delivered package. At Step 610, information about each package is made available to one or more of a shipper, a recipient and/or a third-party. The process ends at Step 612.

FIG. 7 is an exemplary flowchart illustrating the steps involved in delivering a package to a delivery location, confirming the delivering, and transmitting information about the confirmed delivery to a customer associated with the delivery location, in an embodiment of the invention. Step 700 begins the delivery confirmation process. In Step 702, the service provider selects the location to which the next delivery is to be made from a list of possible delivery locations that are stored within the data acquisition and data storage device 304. Step 704 involves a decision as to whether the service provider is returning to the same delivery location for a second (or greater) time with the same data acquisition and storage device 304 in the same day (i.e., the information in the data acquisition and storage device 304 has not been uploaded to the server 308 since the last visit to the same delivery location). If it is not a return visit, then in Step 706, the service provider scans the primary location identifier 316 that is located on a placard 302 at the delivery location with the data acquisition and storage device 304. If this is the second (or greater) time that the service provider is returning to the same delivery location with the same data acquisition and storage device 304 in the same day, then in Step 708 the service provider scans the secondary (or one of the secondary) location identifiers 318 on the placard 302 with the data acquisition and storage device 304. In Step 710, the service provider scans the package identifier 322, 326 of each package 320, 324 that is to be delivered to that delivery location with the data acquisition and storage device 304. In Step 712, the service provider obtains the signature of a consignee at the delivery location in order to complete the package delivery transaction. This signature is generally captured electronically by the data acquisition and storage device 304. In one embodiment, the data acquisition and storage device 304 is programmed to recognize the delivery location address and prompts the service provider to obtain the location identifier 316, 318. In such instances, the data acquisition and storage device 304 may, for example, display a notice instructing the service provider to scan the location identifier, provide a warning such as a vibration, sound or visible indicator such as a flashing light, or otherwise indicate to the service provider that the delivery transaction is not complete until the location identifier is scanned. In other embodiments, once the service provider has indicated that delivery is complete, the data acquisition and storage device 304 may require the service provider to confirm that a location identifier 316, 318 has been obtained. Such confirmation may be, for example, simply responding to a question posed by the data acquisition and storage device as to whether or not a location identifier 316, 318 has been obtained for that delivery location. In yet other embodiments, once the service provider has scanned a package identifier 322, 326 with the data acquisition and storage device 304 of a package 320, 324 to be delivered at a location where confirmation of delivery is desired, the data acquisition and storage device 304 will have been programmed to recognize that the package 320, 324 is scheduled to be delivered at a location where delivery confirmation is desired. The data acquisition and storage device 304 will then prompt the service provider to obtain the desired location identifier 316, 318 or ask for confirmation that a location identifier 316, 318 has been scanned. In Step 714, the software of the data acquisition and storage device 304 links the package identifiers 322, 326 with either the primary location identifier 316 or the secondary location identifier 318, whichever was scanned in the previous steps. This linkage provides confirmation that the packages 320, 324 associated with the package identifiers 322, 326 were delivered to the location associated with either the unique primary location identifier 316 or the unique secondary location identifier 318. Note that the unique primary and secondary location identifiers 316, 318 found on a single placard 302 are associated with the same location. In Step 716, information from the data acquisition and storage device 304 is transmitted to a server 308. This information includes the linked location and package identifiers. In Step 718, the information residing on the server 308 is used to create one or more reports for the customer that is associated with the delivery location and for the service provider. Information from one or more of these reports is transmitted to the customer in Step 720, including information about the linked location and package identifiers, which the customer may use as confirmation of delivery of the package to the location associated with the location code. Such confirmation may be used by the customer to release payment to vendors and for the allocation of inventory. Step 722 ends the delivery confirmation process.

Although primarily described herein for delivery to a retail store system, the present inventions are not limited as such and are applicable in numerous other instances. Other embodiments of the invention may be utilized to confirm delivery to individuals whereby the individual will be have a unique identifier that is obtained by a service provider when delivering a package to the individual and such unique identifier is linked to the tracking identifier of each delivered package. The unique identifier may be associated with the delivery location or it may be associated with the individual. Just as with a location identifier, the unique identifier may be one or more of RFID tags, infrared, magnetic strips, electronic signals, optical signals, digital signatures, sounds, colors, shapes, odors, etc., or any other method of identifying the individual or the location.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for confirming the delivery of one or more items by a delivery service to a delivery location, comprising:
   a placard located at the delivery location, already posted at the delivery location at time of delivery, comprising at least one machine-readable unique location indicia;
   a machine-readable unique item indicia associated with each of the one or more items;
   a data acquisition and storage device having a scanning element and capable of transferring information, wherein the at least one machine-readable unique location indicia is scanned by the scanning element and each of the machine-readable unique item indicia are scanned by the scanning element and the location indicia is linked to each of the machine-readable unique item indicia to create linked item indicia; and
   a server, to which information about said location indicia and said linked item indicia is transferred from said data acquisition and storage device and made accessible over a network via the server.

2. The system of claim 1, wherein the at least one machine-readable unique location indicia is comprised of at least one barcode.

3. The system of claim 1, wherein the at least one machine-readable unique location indicia is comprised of at least one RFID transponder tag.

4. The system of claim 1, wherein the machine-readable unique item indicia associated with each of the one or more items is comprised of a barcode.

5. The system of claim 1, wherein the machine-readable unique item indicia associated with each of the one or more items is comprised of a RFID transponder tag.

6. A system for confirming the delivery of one or more parcels by a delivery service to a delivery location, comprising:
   a placard having at least a first unique barcode and a second unique barcode located thereon, wherein said placard is located at the delivery location and is already posted at the delivery location at the time of delivery;
   a package tracking barcode associated with each of the one or more parcels;
   a data acquisition and storage device having a scanning element and capable of transferring information, wherein said scanning element scans the first unique barcode and each of the package tracking barcodes associated with parcels delivered in a first delivery and the first unique barcode is linked to each of the package tracking barcodes of the parcels in the first delivery; and wherein said scanning element scans the second unique barcode and each of the package tracking barcodes associated with the parcels delivered in a second delivery and the second unique barcode is linked to each of the package tracking barcodes of the parcels in the second delivery; and
   a server, which receives information about said first unique barcode and each of the package tracking bar codes and information about said second unique barcode and each of the package tracking bar codes associated with parcels in a second delivery from the data acquisition and storage device and made accessible over a network.

7. A method of providing indication of the delivery location of one or more parcels by a delivery service, said method comprising:
   providing a placard at the delivery location comprising at least one unique machine-readable location indicia wherein said placard is already posted at the delivery location at the time of delivery;
   providing a unique machine-readable package indicia on each of the one or more parcels;
   scanning the unique machine-readable location indicia at the delivery location;
   scanning each of the unique machine-readable package indicia on each of the one or more parcels;
   linking the unique machine-readable location indicia to each of the unique machine-readable package indicia;
   delivering said one or more parcels at said delivery location; and
   making said information about said delivery accessible over a network; wherein said information includes information about the unique machine-readable location indicia and each of the unique machine-readable package indicia linked to the unique machine-readable location indicia.

8. The method of claim 7, wherein scanning the unique machine-readable location indicia at the delivery location and scanning each of the unique machine-readable package indicia on each of the one or more parcels is performed by a data acquisition and storage device having an associated scanning element.

9. The method of claim 8, wherein linking the unique machine-readable location indicia to each of the unique machine-readable package indicia is performed electronically by the data acquisition and storage device.

10. The method of claim 8, wherein linking the unique machine-readable location indicia to each of the unique machine-readable package indicia is performed electronically by a computing device separate from the data acquisition and storage device.

11. The method of claim 7, wherein providing a placard at the delivery location comprising at least one unique machine-readable location indicia and providing a unique machine-readable package indicia on each of the one or more parcels is performed by providing a placard comprising at least one unique barcode at the delivery location and a unique barcode on each of the one or more parcels.

12. The method of claim 7, wherein providing a placard at the delivery location comprising at least one unique machine-readable location indicia and providing a unique machine-readable package indicia on each of the one or more parcels is performed by providing at least one RFID transponder tag at the delivery location and a RFID transponder tag on each of the one or more parcels.

13. The method of claim 7, wherein providing a placard at the delivery location comprising at least one unique machine-readable location indicia at the delivery location and providing a unique machine-readable package indicia on each of the one or more parcels is performed by providing at least one RFID transponder tag at the delivery location and a unique barcode on each of the one or more parcels.

14. The method of claim 7, wherein providing a placard at the delivery location comprising at least one unique machine-readable location indicia at the delivery location and providing a unique machine-readable package indicia on each of the one or more parcels is performed by providing at least one unique barcode at the delivery location and a RFID transponder tag on each of the one or more parcels.

15. A method of providing indication of the delivery location of at least two parcels by a delivery service, said method comprising:
 providing a placard at the delivery location comprising at least two unique machine-readable location indicia at the delivery location; wherein said at least two unique machine-readable location indicia are comprised of a primary unique machine-readable location indicia and a secondary machine-readable location indicia, wherein said placard is already posted at the delivery location at the time of delivery;
 providing at least two sets of parcels for delivery at the delivery location, a first set of parcels that is comprised of at least one parcel having a unique machine-readable package indicia on each of the first set of parcels and a second set of parcels that is comprised of at least one parcel having a unique machine-readable package indicia on each of the second set of parcels;
 delivering the first set of parcels at the delivery location during a first delivery by:
  scanning the primary unique machine-readable location indicia at the delivery location and scanning each of the unique machine-readable package indicia on each of the first set of parcels; and
  linking the primary unique machine-readable location indicia to each of the unique machine-readable package indicia on each of the first set of parcels;
 delivering the second set of parcels at the delivery location during a second delivery by:
  scanning the secondary unique machine-readable location indicia at the delivery location and scanning each of the unique machine-readable package indicia on each of the second set of parcels; and
  linking the secondary unique machine-readable location indicia to each of the unique machine-readable package indicia on each of the second set of parcels; and
  making information about said first delivery and second delivery accessible over a network;
 wherein said information includes information about the primary unique machine-readable location indicia and each of the unique machine-readable package indicia of the first set of parcels that is linked to the primary unique machine-readable location indicia and includes information about the secondary unique machine-readable location indicia and each of the unique machine-readable package indicia of the second set of parcels that is linked to the secondary unique machine-readable location indicia.

16. A method of determining the location where one or more shipped parcels are received, comprising:
 providing a placard at the delivery location comprising one or more unique location identifiers that are associated with at least one delivery location, wherein said placard is already posted at the time of delivery;
 linking at least one of the one or more unique location identifiers that may be obtained only while at the delivery location where at least one of the one or more shipped parcels are received with a unique package identifier for each parcel of the one or more shipped parcels that are delivered at the delivery location thereby indicating the delivery location where the packages was delivered, and
 making available information about the one or more shipped parcels accessible over a network.

17. A method of inventory reconciliation, comprising:
 shipping one or more packages containing inventory items by a service provider to one or more delivery locations, wherein each of the one or more packages have a unique package identifier and each delivery location has a placard comprising at least one unique delivery location identifier, wherein said placard is already posted at the delivery location at the time of delivery;
 recording the inventory items that are shipped to each delivery location in an inventory accounting for each delivery location along with the unique package identifier of the one or more packages that contain the inventory items shipped to each delivery location;
 receiving from the service provider information about the delivery location that each of the one or more packages are delivered, wherein said information includes each the one or more unique delivery location identifiers and the unique package identifier of each package that is delivered to each of the one or more delivery locations; and
 updating the inventory accounting for each delivery location with the information from the service provider that indicates an actual delivery location for each of the one or more packages that were shipped.

18. A method of providing on a computer indication of the delivery location of one or more parcels by a delivery service, said method comprising:
 providing a placard at the delivery location comprising at least one unique machine-readable location indicia wherein said placard is already posted at the delivery location at the time of delivery;
 providing a unique machine-readable package indicia on each of the one or more parcels;
 scanning the unique machine-readable location indicia at the delivery location with a scanning element associated with a data acquisition and storage device;
 scanning each of the unique machine-readable package indicia on each of the one or more parcels with the scanning element associated with the data acquisition and storage device;
 electronically linking the unique machine-readable location indicia to each of the unique machine-readable package indicia with the data acquisition and storage device;
 delivering said one or more parcels at said delivery location; and transferring said information about said delivery from the data acquisition and transfer device to a computer having a memory, storing said information in the memory and making said information about said delivery accessible over a network connected to said computer;

wherein said information includes information about the unique machine-readable location indicia and each of the unique machine-readable package indicia linked to the unique machine-readable location indicia.

19. The method of claim 18, wherein providing a placard at the delivery location comprising at least one unique machine-readable location indicia and providing a unique machine-readable package indicia on each of the one or more parcels is performed by providing at least one unique barcode at the delivery location and a unique barcode on each of the one or more parcels.

20. The method of claim 19, wherein providing a placard at the delivery location comprising at least one unique machine-readable location indicia and providing a unique machine-readable package indicia on each of the one or more parcels is performed by providing at least one RFID transponder tag at the delivery location and a unique barcode on each of the one or more parcels.

21. The method of claim 19, wherein providing a placard at the delivery location comprising at least one unique machine-readable location indicia and providing a unique machine-readable package indicia on each of the one or more parcels is performed by providing at least one unique barcode at the delivery location and a RFID transponder tag on each of the one or more parcels.

22. The method of claim 18, wherein providing a placard at the delivery location comprising at least one unique machine-readable location indicia and providing a unique machine-readable package indicia on each of the one or more parcels is performed by providing at least one RFID transponder tag at the delivery location and a RFID transponder tag on each of the one or more parcels.

23. A method of providing on a computer indication of the delivery location of one or more parcels by a delivery service, said method comprising:
providing a placard at the delivery location comprising at least one unique machine-readable location indicia, wherein said placard is already posted at the delivery location at the time of delivery;
providing a unique machine-readable package indicia on each of the one or more parcels;
scanning the unique machine-readable location indicia at the delivery location with a scanning element associated with a data acquisition and storage device;
scanning each of the unique machine-readable package indicia on each of the one or more parcels with the scanning element associated with the data acquisition and storage device;
delivering said one or more parcels at said delivery location;
transferring said information about said delivery from the data acquisition and transfer device to a computer having a memory; and
electronically linking the unique machine-readable location indicia to each of the unique machine-readable package indicia with the computer;
storing said information in the memory and making said information about said delivery accessible over a network connected to said computer;
wherein said information includes information about the unique machine-readable location indicia and each of the unique machine-readable package indicia linked to the unique machine-readable location indicia.

24. The method of claim 23, wherein providing a placard at the delivery location comprising at least one unique machine-readable location indicia and providing a unique machine-readable package indicia on each of the one or more parcels is performed by providing at least one unique barcode at the delivery location and a unique barcode on each of the one or more parcels.

25. The method of claim 23, wherein providing a placard at the delivery location comprising at least one unique machine-readable location indicia and providing a unique machine-readable package indicia on each of the one or more parcels is performed by providing at least one RFID transponder tag at the delivery location and a RFID transponder tag on each of the one or more parcels.

26. The method of claim 23, wherein providing a placard at the delivery location comprising at least one unique machine-readable location indicia and providing a unique machine-readable package indicia on each of the one or more parcels is performed by providing at least one REID transponder tag at the delivery location and a unique barcode on each of the one or more parcels.

27. The method of claim 23, wherein providing a placard at the delivery location comprising at least one unique machine-readable location indicia and providing a unique machine-readable package indicia on each of the one or more parcels is performed by providing at least one unique barcode at the delivery location and a RFID transponder tag on each of the one or more parcels.

28. A system for providing the computer indication of the delivery location of one or more parcels, said system comprising:
a placard at the delivery location comprising at least one unique machine-readable location indicia at the delivery location, wherein said placard is already posted at the delivery location at the time of delivery;
a machine readable package indicia associated with each of the one or more parcels;
a data acquisition and storage device having a scanning element and capable of transferring information, wherein the at least one machine-readable unique location indicia is scanned by the scanning element;
a server, to which information about scanning the unique machine-readable location indicia at the delivery location with a scanning element associated with a data acquisition and storage device is transferred and electronically linked to each of the unique machine-readable package indicia;
wherein said information is accessible over a network connected to said server; wherein said information includes information about the unique machine-readable location indicia and each of the unique machine-readable package indicia linked to the unique machine-readable location indicia.

29. The system of claim 28, wherein the at least one machine-readable unique location indicia is comprised of at least one RFID transponder tag.

30. The system of claim 28, wherein the at least one machine-readable unique location indicia is comprised of a barcode.

31. A system for providing the computer indication of the delivery location of one or more parcels, said system comprising:

a placard at the delivery location comprising at least one machine-readable indicia wherein said placard is already posted at the delivery location at the time of delivery;

a machine readable package indicia associated with each of the one or more parcels;

a data acquisition and storage device having a scanning element and capable of transferring information, wherein the at least one machine-readable unique location indicia is scanned by the scanning element;

a server, to which information about scanning the unique machine-readable location indicia at the delivery location with a scanning element associated with a data acquisition and storage device is transferred and electronically linked to each of the unique machine-readable package indicia; and wherein said information is accessible over a network connected to said server; wherein said information includes information about the unique machine-readable location indicia and each of the unique machine-readable package indicia linked to the unique machine-readable location indicia.

* * * * *

UNITED STATES PATENT AND TRADEMARK OFFICE
CERTIFICATE OF CORRECTION

PATENT NO. : 7,341,186 B2  Page 1 of 1
APPLICATION NO. : 10/872348
DATED : March 11, 2008
INVENTOR(S) : Mrozik et al.

It is certified that error appears in the above-identified patent and that said Letters Patent is hereby corrected as shown below:

Column 20,
Line 22, "REID" should read --RFID--.

Signed and Sealed this

Eighth Day of July, 2008

JON W. DUDAS
*Director of the United States Patent and Trademark Office*